United States Patent [19]
Takeda et al.

[11] Patent Number: 4,626,647
[45] Date of Patent: Dec. 2, 1986

[54] FLASH WELDING MACHINE

[75] Inventors: Akimichi Takeda; Akiyoshi Uomori, both of Hyogo, Japan

[73] Assignee: Mitsubishi Denki Kabushiki Kaisha, Tokyo, Japan

[21] Appl. No.: 756,422

[22] Filed: Jul. 18, 1985

[30] Foreign Application Priority Data

Jul. 19, 1984 [JP] Japan ................... 59-151507

[51] Int. Cl.$^4$ ............................................. B23K 11/04
[52] U.S. Cl. ....................................... 219/97; 219/101
[58] Field of Search ................. 219/97, 100, 101, 104, 219/106, 57

[56] References Cited

U.S. PATENT DOCUMENTS 4,153,830  5/1979  Baba et al. ........................... 219/101
4,304,977  12/1981  Hanai et al. ........................... 219/97

FOREIGN PATENT DOCUMENTS 5060  1/1978  Japan .
199579  12/1982  Japan ................... 219/100

Primary Examiner—E. A. Goldberg
Assistant Examiner—C. M. Sigda
Attorney, Agent, or Firm—Sughrue, Mion, Zinn, Macpeak and Seas

[57] ABSTRACT

A flash welding machine for butt welding the trailing edge of a preceding metal strip to the leading edge of a following metal strip in a rolling mill or the like. A preceding carriage and a following carriage are provided, movably mounted on a common set of rails. Each carriage is provided with electrodes capable of clamping respective ones of the preceding strip and the following strip when the two strips are in abutment with on another. Welding cylinders are provided for selectively joining the two carriers when the two strips are in abutment and the welding operation is to be performed, and then releasing the carriers from one another.

1 Claim, 5 Drawing Figures

FLASH WELDING MACHINE

BACKGROUND OF THE INVENTION

The present invention relates to a flash welding machine for use in welding the trailing edge of a preceding strip to the leading edge of a following strip while the two strips are moving.

In order to improve the efficiency of a steel processing line, the trailing edge of a preceding strip is welded to the leading edge of a following strip while they are moving. Referring to the conventional arrangement shown in FIG. 1, when the trailing edge of a preceding strip 18 to be rolled by a rolling mill 27 passes a predetermined position on a rolling line, a welding machine 28 is moved in the direction of movement of the preceding strip 18, and an uncoiler 29 is driven at a predetermined speed to make a following strip 19 follow the preceding strip 18. The welding machine 28 clamps each of the strips 18 and 19 in a position suitable for welding within a section S while moving synchronously with the strips 18 and 19. The excess metal in the welding zone is removed by a trimmer 31. Reference numeral 30 designates a looper. The welding machine 28, upon finishing the welding operation on the strips 18 and 19, is returned to its standby position.

FIG. 2 shows a conventional processing line arrangement in greater detail, which includes rails 1; a carriage 2 equipped with wheels 3 traveling on the rails 1; a welding cylinder 4 provided at one end of the carriage 2; a shutdown device 5 for stopping the operation of the welding cylinder 4; a device 6 for positioning the end of a strip, the device 6 being movable in a predetermined direction and being mounted approximately at the center of the carriage 2; rails 7 arranged on the carriage 2; a fixed stand 8 mounted on the other end of the carriage 2; a clamp device 9 fastened to the fixed stand 8; a pair of separable electrodes 10 which are moved together and separated by operation of the clamp device 9; a welding transformer 11 mounted on the fixed stand 8; a conductor 12 connecting the electrodes 10 to the welding transformer 11; a moving stand 13 mounted on the rails 7 and equipped with wheels 14 movable thereon, the movable stand 13 being coupled to the welding cylinder 4; a clamp device 15 installed on the moving stand 13; a pair of separable electrodes 16 which are moved together and separated by the clamp device 15; and a flexible conductor 17 connecting the electrodes 16 to the welding transformer 11.

In the arrangement of FIG. 2, the pairs of electrodes 10 and 16 are located the same distance from the rails 1, and the welding cylinder 4 is used to position the electrodes 16 opposite the electrodes 10 with a predetermined spacing. While the preceding strip 18 is fed to the rolling line of FIG. 1 in the aforementioned state and moved between the pairs of electrodes 10 and 16, the welding machine is allowed to remain at its standby position.

When a detector (not shown) mounted on the carriage 2 detects the trailing edge of the preceding strip 18 as the movement thereof progresses, the positioning device 6 is elevated and the preceding strip 18 is clamped by the device 9 when its trailing edge to abuts the positioning device 6, whereby the preceding strip 18 is clamped between the electrodes 10 at a predetermined position thereof. Then the carriage 2 is allowed to travel with the preceding strip 18, and, after the preceding strip 18 is thus clamped, the positioning device 6 is lowered.

The following strip 19 is fed to the line at a predetermined velocity when the trailing edge of the preceding strip 18 is clamped between the electrodes 10. The leading edge of the following strip 19 is thus made to abut the trailing edge of the preceding strip 18, whereupon the clamp device 15 is operated to make the electrodes 16 clamp the following strip 19.

When the electrodes 10 and 16 clamp the preceding and following strips 18 and 19, the welding cylinder 4 is operated to set the required distance for the flash welding process and the upsetting process. Consequently, the moving stand 13 equipped with the electrodes 16 is moved toward the fixed stand 8 on the rails 7 and the preceding and following strips 17 and 18 are thus welded together.

After the welding cylinder 4 has been operated in the predetermined manner, the shutdown device 5 operates to stop the operation of the welding cylinder 4, which is then reset as the clamp devices 9 and 15 are released. Upon completion of the series of operations described above, the carriage 2 is returned to its standby position.

In this conventional welding machine, since a combination of fixed and moving parts is mounted on the carriage 2 and made to move together with the carriage 2, the machine tends to be heavy and difficult to control in terms of its movement. Other disadvantages include a high machine cost and a large space required for machine installation.

SUMMARY OF THE INVENTION

The present invention remedies the drawbacks above by providing a compact lightweight welding machine comprising preceding and following carriages equipped with electrodes capable of clamping moving steel strips and being arranged on rails, the electrodes having a predetermined space therebetween, and welding cylinders used to couple and release the carriers to and from one another.

DESCRIPTION OF THE PREFERRED EMBODIMENTS

Figure 1:
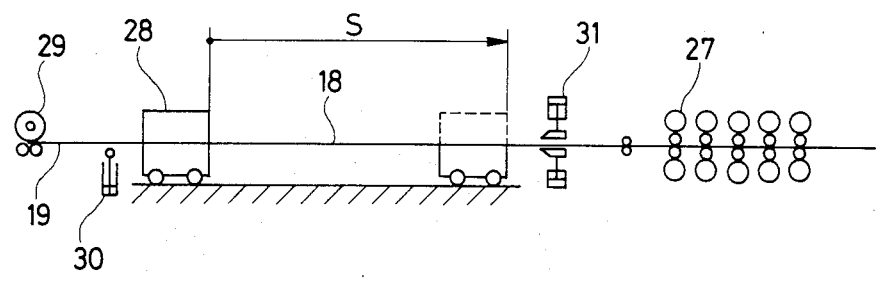
FIG. 1 is an elevational view illustrating the construction of a conventional steel rolling line.
Figure 2:
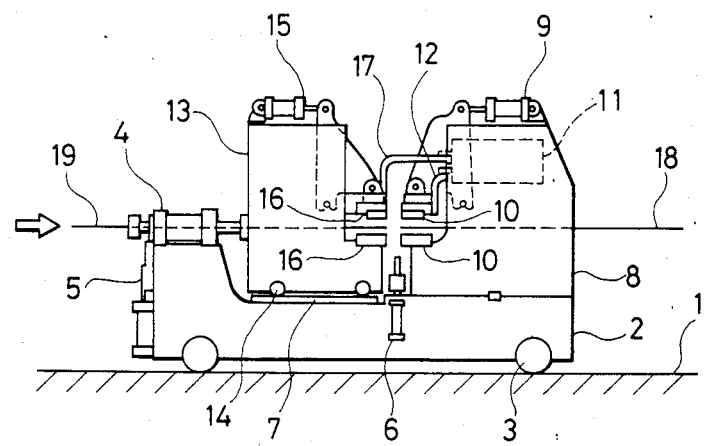
FIG. 2 is an elevational view of a conventional welding machine.
Figure 3:
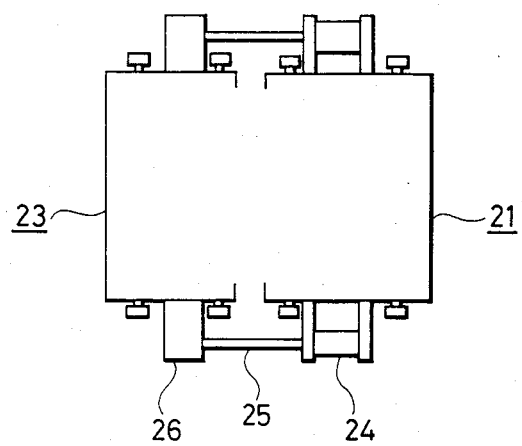
FIG. 3 is a top view illustrating an embodiment of the present invention.
Figure 4:
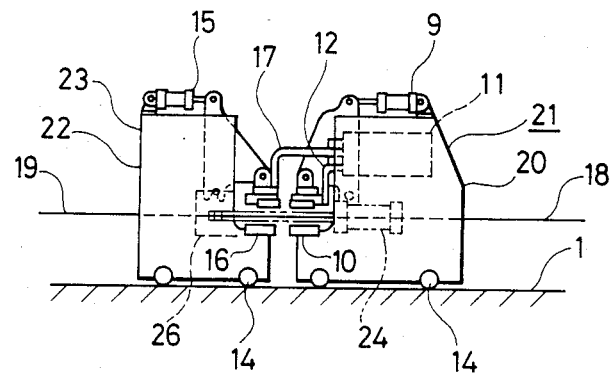
FIG. 4 is an elevational view of the apparatus of FIG. 3.

FIGS. 3 and 4 show a preferred embodiment of a flash welding machine of the present invention wherein reference numerals 1, 9 to 12, and 14 to 19 designate identical components in the drawings of the aforesaid conventional welding machine. The welding machine in FIGS. 3 and 4 includes a first carriage 20 riding on rails 1 and supported thereon via wheels 14; elements 9 to 12, 14, and 20 constitute a preceding carriage 21 traveling on the rails 1. A second carriage 22 rides on the rails 1 and is supported via wheels 14; elements 14 to 17 and 22 constitute a following carriage 23. Electrodes 10 and 16 are arranged opposite to each other, and welding cylinders 24 are mounted on the preceding carriage 21 and are equipped with cylinder shafts 25 which are movable through the predetermined distance required for the flash welding and upsetting processes. Couplers 26 couple the cylinder shafts 25 to the following carriage 23 and thus adjust the relative spacing between the electrodes 10 and 16.

Figure 5:
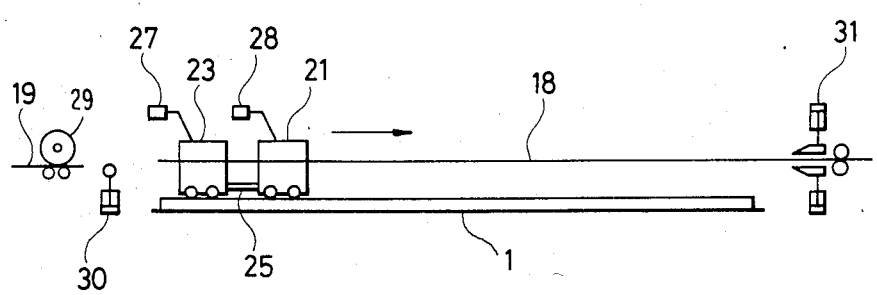
FIG. 5 is an elevational view illustrating the operation of the embodiment of FIG. 3.

In the welding machine thus constructed, first and second detectors 27 and 28, which detect the edge portions of the moving strips and produce signals accordingly, are arranged at respective predetermined positions on the carriages 21 and 23 while a preceding strip 18 moves between the electrodes 10 and 16, as shown in FIG. 5, whereby the carriages 21 and 23 are operated in a predetermined manner on receiving the signals from the detectors 27 and 28.

The operation of the welding machine will subsequently be described.

As shown in FIG. 5, when the first detector 27 detects the trailing edge of the preceding strip 18 moving in the direction shown by an arrow and produces a signal indicative thereof, each of the carriages 21 and 23, on receiving this signal, starts moving in the direction of movement of the preceding strip 18 at a predetermined velocity. An uncoiler 29 concurrently operates to feed the following strip 19 at a such a velocity as to make it follow the movement of the preceding strip 18.

When the second detector 28 detects the trailing edge of the preceding strip 18 and produces a detection signal, the clamp device 9 of the preceding carriage 21 operates to cause the electrodes 10 to clamp the preceding strip 18. As a result, the carriages 21 and 23 are conveyed together with the preceding strip 18 at the designated speed.

When the first detector 27 detects the leading edge of the following strip 19, the uncoiler 29 is controlled, on receiving the detection signal from the first detector 27, to increase the following strip feeding velocity to the extent that the following strip 19 catches up to and closes the gap or separation between itself and the preceding strip 18.

When the second detector 28 detects the leading edge of the following strip 19, the velocity at which the following strip 19 is fed by the uncoiler is reduced to its previous level, the clamp device 15 of the following carriage 23 is operated, and an instruction is issued to drive the welding cylinders 24. Thus, the trailing edge of the preceding strip 18 is abutted with the leading edge of the following strip 19 at the predetermined velocity and the following strip 19 is clamped between the electrodes 16. The welding cylinders 24 thus driven enable the carriages 21 and 23 to coact with the strips 18 and 19, which are then subjected to flash and upset welding.

When the welding cylinders have completed their operation, the clamp devices 9 and 15 are reset and the electrodes 10 and 16 are allowed to release their hold of the strips 18 and 19, respectively. Consequently, the carriages 21 and 23 are caused to stop their operation and are returned to their prior standby positions.

Although a rolling line has been referred to in the above embodiment, similar effects may also be obtained in other steel processing lines.

As set forth above, it is possible to make such a welding machine compact and lighweight according to the present invention by constructing the welding machine of component parts including a first carriage for use in detecting the trailing edge of a preceding strip and clamping the preceding strip between electrodes, and a second carriage for use in clamping a following strip with electrodes energized when the leading edge of the following strip is abutted against the trailing edge of the preceding strip, the first carriage being coupled to the second carriage by welding cylinders in such a manner that the former and the latter can be joined together with a predetermined distance therebetween. Accordingly, the movement of the welding machine is made readily controllable.

We claim:

1. An apparatus for butt welding a trailing edge of a preceding metal strip (18) to a leading edge of a following metal strip (19) during the continuous conveyance of the strips in a common direction, comprising:
   (a) a stationary set of rails (1) disposed parallel to the direction of conveyance,
   (b) a first, preceding carriage (21) directly and movably mounted on the rails,
   (c) a second, following carriage (23) directly and movably mounted on the rails,
   (d) each of the carriages including respective clamping electrode pairs (10, 16) and actuating means (9, 15) operatively coupled thereto,
   (e) means (11, 12, 17) mounted on one of the carriages for electrically energizing the electrode pairs,
   (f) fluid piston and cylinder means (24–26) directly intercoupling the first and second carriages for controlling a separation therebetween, and
   (g) first and second strip edge detectors (27, 28) respectively mounted on the second and first carriages and spaced apart in the direction of conveyance, an output of the first detector:
      (1) initiating the movement of both carriages in the direction of conveyance upon detecting the trailing edge of the preceding strip, and
      (2) increasing the feed velocity of the following strip upon detecting the leading edge thereof, and
   an output of the second detector:
      (1) energizing the actuating means on the first carriage upon detecting the trailing edge of the preceding strip to clamp said preceding strip between the electrode pairs on the first carriage,
      (2) energizing the actuating means on the second carriage upon detecting the leading edge of the following strip to clamp said following strip between the electrode pairs on the second carriage, and concurrently,
      (3) reducing the feed velocity of the following strip, and
      (4) actuating the piston and cylinder means to reduce the separation between the first and second carriages to abut the strip edges pursuant to a flash welding thereof.

* * * * *